3,166,588
PROCESS FOR THE PRODUCTION OF
α-HYDROXY AMIDES
Herbert E. Johnson, South Charleston, W. Va., assignor to Union Carbide Corporation, a corporation of New York
No Drawing. Filed Apr. 14, 1961, Ser. No. 102,963
1 Claim. (Cl. 260—559)

This invention relates to a novel process for the production of alpha-hydroxy amides which involves the use of a cyanohydrin as a starting material.

More particularly, this invention relates to a process for the production of alpha-hydroxy amides which comprises reacting a cyanohydrin with an alcohol and a hydrogen halide under substantially anhydrous conditions.

The novel process of this invention can be represented by the following reaction scheme:

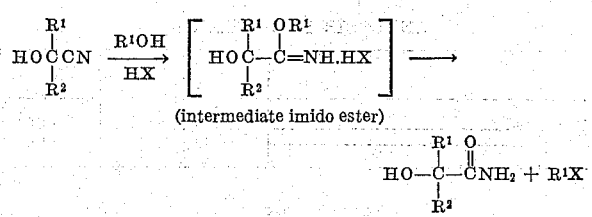

(intermediate imido ester)

$$\longrightarrow HO-\underset{R^2}{\underset{|}{C}}-\overset{R^1}{\overset{|}{\phantom{C}}}\overset{O}{\overset{\|}{C}}NH_2 + R^1X$$

wherein each $R^1$ individually represents an alkyl radical having from 1–12 carbon atoms, an alkenyl radical having from 3–12 carbon atoms or an aromatic radical, $R^2$ represents $R^1$ and hydrogen, and X represents bromine, chlorine and iodine.

Illustrative of the cyanohydrins which can be employed in the novel process of this invention one can include isobutyraldehyde cyanohydrin, acetaldehyde cyanohydrin, alpha-methylbutyraldehyde cyanohydrin, phenylacetaldehyde cyanohydrin, propionaldehyde cyanohydrin, acetone cyanohydrin, acetophenone cyanohydrin, cyclohexanone cyanohydrin, methylethyl ketone cyanohydrin, acrolein cyanohydrin, etc.

The cyanohydrins which are used as starting materials in the process of this invention are well known in the art and can be prepared by various methods. One convenient method of preparing them is by reacting an aldehyde or a ketone with hydrocyanic acid. This method can be represented by the following reaction scheme wherein $R^1$ and $R^2$ have the same meaning as previously set forth.

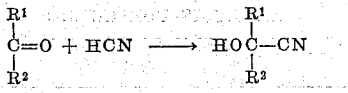

The alcohols which are operable in the novel process of this invention include any primary or secondary alcohol corresponding to the formula previously set forth. Typical alcohols which are operative include methyl, ethyl, propyl, isopropyl, decyl, sec-butanol, benzyl, allyl alcohols, etc.

The instant process for the production of alphahydroxy amides possess many desirable advantages over the prior art methods. The said prior methods usually involved the hydrolysis of cyanohydrins with various aqueous acids. These processes were not satisfactory since the alpha-hydroxy amides tend to be very water soluble which makes their isolation from the reaction mixture very difficult. Additionally, since the prior art methods involved hydrolysis, it was difficult to stop the hydrolysis before the formation of alpha-hydroxy acids instead of the desired alpha-hydroxy amides.

In contrast to the prior art processes, the instant process is conducted in an anhydrous medium so that the alpha-hydroxy amides formed can be easily isolated by conventional means such as filtration, or by direct distillation from the reaction mixture. Additionally, the absence of water excludes the possibility of further reaction of the alpha-hydroxy amides to the corresponding hydroxy acids.

Accordingly, it is the primary object of this invention to provide a process for the production of alpha-hydroxy amides which is convenient, economical and allows for easy separation of the desired product from the reaction mixture.

As has been previously mentioned, the instant process involves the reaction of a cyanohydrin with an alcohol and a hydrogen halide under substantially anhydrous conditions. The process can be carried out by placing the cyanohydrin and alcohol in a reaction vessel, bubbling in a hydrogen halide until an intermediate ester is formed, and then pyrolyzing this ester and distilling to yield the alpha-hydroxy amide.

The amount of hydrogen halide employed is not narrowly critical and can vary over a wide range. However, it is preferred to use an excess of hydrogen halide to cyanohydrin since it insures completion of the reaction. Molar ratios of hydrogen halide to the cyanohydrin of 1:1 and lower to 50:1 and higher are operable.

However, for practical considerations, the preferred amount of hydrogen halide employed in the novel process of this invention is that amount which will completely saturate the alcohol employed or, if a solvent is employed in addition to the alcohol, that amount which will completely saturate the solvent.

The amount of alcohol employed can also vary over a wide range. However, the use of an excess of alcohol to the cyanohydrin may result in the formation of substantial amounts of ortho or carboxylic ester intermediates which reduces the overall efficiency of the process. Thus, although a molar ratio of alcohol to cyanohydrin of from 1:1 and lower to 50:1 and higher can be employed, it is preferred to operate with a ratio of 0.5:1 to 1:1.

The temperature at which the mixture of alcohol and cyanohydrin is kept while the hydrogen halide is added, is also not narrowly critical. Temperatures within the range of 0 and lower to 50° C. and higher are operable. The preferred range is 0 to 25° C. It is also desirable, though not necessary, to let the reaction mixture stand for a period of time before pyrolyzing the intermediate ester. This length of time can be as much as 48 hours although 4–20 hours will suffice. This standing period results in improved yields of the desired alpha-hydroxy amides. The preferred hydrogen halide is hydrogen chloride although hydrogen bromide and hydrogen iodide are also operable.

The temperature at which the pyrolysis of the intermediate ester takes place is obviously dependent on the particular cyanohydrin and alcohol employed. However, these temperatures are usually 60 to 200° C.

In the preferred embodiment of this invention, the reaction is conducted in the presence of an inert solvent. The use of a solvent eliminates the necessity of having a pyrolysis step to obtain the desired alpha-hydroxy amide. When a solvent is employed, the reaction mixture is merely refluxed for a period of time and amide is recovered by filtering the reaction mixture. The reflux period can vary over a wide range of from 1 to 10 hours. The preferred time is from about 4 to 6 hours. It is to be understood that the product can be further purified by conventional means such as recrystallization.

The particular solvent employed is not critical and any solvent which is inert to the reaction and boils within the range of about 68 to 200° C. at 760 mm. of mercury, can be used. Illustrative of solvents which are operable include benzene, xylene, dioxane, diisopropyl ether, toluene, etc. The preferred solvent is xylene.

Alpha-hydroxy amides are old in the art and have been used in a wide variety of applications and most recently as substitutes for the corresponding 2-amino acids.

The following examples will illustrate the novel process of this invention.

EXAMPLE 1

*Alpha-hydroxyisovaleramide*

A solution of 50 grams of isobutyraldehyde cyanohydrin and 24 grams of ethanol in 250 ml. of benzene was saturated with dry hydrogen chloride (32 grams) at 25° C. The mixture was then heated slowly to reflux temperature and refluxed 6.5 hours. Upon cooling the product precipitated and was collected to give 38 grams of colorless crystals, M.P. 99–102° C. Reported M.P. 104° C.

EXAMPLE 2

Example 1 was repeated except that the reaction mixture was allowed to stand 16 hours at 25° C. before refluxing for four hours. This experiment resulted in 57 grams of product.

EXAMPLE 3

*α-Hydroxyisovaleramide*

A solution of 50 grams of isobutyraldehyde cyanohydrin and 46 grams of ethanol in 300 ml. of dry isopropyl ether was saturated with dry hydrogen chloride (76 grams at 25° C.). The mixture was then heated slowly to reflux temperature and refluxed for 1 hour. Upon cooling the mixture, 66 grams of colorless crystals were obtained, M.P. 100–101° C. The infrared spectrum of this material indicates contamination with the intermediate imido ester hydrochloride.

EXAMPLE 4

*α-Hydroxyisovaleramide*

A mixture of 50 grams of isobutyraldehyde cyanohydrin, 27.6 grams of ethanol, 500 ml. of dioxane and 177 grams of hydrogen chloride was prepared and allowed to stand at 25° C. for 18 hours. The mixture was then refluxed for 2 hours, filtered while hot to remove ammonium chloride and then cooled. The precipitated crystals were collected to give 32 grams of impure amide, M.P. 74–77° C.

EXAMPLE 5

*α-Hydroxyisovaleramide*

A solution of 50 grams of isobutyraldehyde cyanohydrin in 300 ml. of isopropanol was saturated with hydrogen chloride at 25° C. The mixture was stirred at 25° C. for 18 hours and then refluxed for 8 hours. After filtering the mixture to remove a small amount of ammonium chloride, the isopropanol was removed by distillation under reduced pressure. The remaining residue would not crystallize and is presumed to be, at least in part, the imido ester hydrochloride. Distillation of this material afforded, after pyrolysis of the ester, 43 grams of the desired product, B.P. 141–148° C. (2.5 mm. Hg). Substitution of sec-butanol for isopropanol gave 43 grams of product, B.P. 130–142° C. (1.5 mm. Hg) and the use of 35 grams of allyl alcohol and 250 ml. of isopropanol also afforded 43 grams of product, B.P. 127–138° C. (1.0 mm. Hg).

EXAMPLE 6

*α-Hydroxypropionamide*

A mixture of 142 grams of acetaldehyde cyanohydrin and 94 grams of ethanol was saturated with hydrogen chloride at 30° C., the temperature being very difficult to control. After several hours the imido ester crystallized from the reaction mixture. The mixture was allowed to stand at 25° C. for 16 hours and then heated under reduced pressure. When the pyrolysis was complete 105 grams of the desired amide distilled at 164–175° C. (5.0 mm. Hg), M.P. 63–65° C. A purified sample melted at 74–75° C. Reported M.P. 74° C.

EXAMPLE 7

*α-Hydroxy-β-methylvaleramide*

A mixture of 57 grams of alpha-methylbutyraldehyde cyanohydrin, 35 grams of allyl alcohol, 250 ml. of benzene and 31 grams of hydrogen chloride was prepared and allowed to stand at 25° C. for 20 hours. After refluxing the mixture for 4 hours it was filtered to remove a trace of solids and evaporated under reduced pressure. The remaining residue was distilled, B.P. 136–154° C. (1.5–3 mm. Hg) to give 49 grams of product that slowly solidified. Repeated crystallization of a sample of this material from isopropyl ether gave an analytical sample as colorless prisms, M.P. 49–56° C.

ANALYSIS FOR $C_9H_{19}NO_2$

|  | C | H | N |
|---|---|---|---|
| Calculated | 54.94 | 9.99 | 10.68 |
| Found | 55.16 | 10.03 | 10.63 |

EXAMPLE 8

*α-Hydroxy-β-phenylpropionamide*

A mixture of 74 grams of phenylacetaldehyde cyanohydrin, 24 grams of ethanol, 300 ml. of dry benzene and 44 grams of hydrogen chloride was prepared and, after standing at 25° C. for 18 hours, refluxed for 5 hours. Upon cooling the mixture, 68 grams of product precipitated as colorless crystals, M.P. 110–113° C. Reported M.P. is 111–112° C.

EXAMPLE 9

*α-Hydroxybutyramide*

A solution of 170 grams of propionaldehyde cyanohydrin and 135 grams of isopropanol in 1.5 l. of xylene was saturated at 25° C. with hydrogen chloride. The mixture was kept for about 50 hours at 25° C. and then refluxed for 7 hours. Cooling the mixture precipitated 179 grams of light yellow solids, M.P. 76–89° C. An analytical sample, M.P. 104–108° C. was prepared by crystallization from benzene-ethanol.

ANALYSIS FOR $C_4H_9NO_2$

|  | C | H | N |
|---|---|---|---|
| Calculated | 46.59 | 8.80 | 13.58 |
| Found | 46.87 | 8.80 | 13.36 |

EXAMPLE 10

*α-Methyl-α-hydroxybutyramide*

A mixture of 21 grams of methyl ethyl ketone cyanohydrin, 8.5 grams of ethanol and 200 ml. of toluene was saturated with hydrogen chloride at 25° C. The reaction mixture was kept at 25° C. for about 50 hours and then refluxed for 2 hours. After a filtration to remove a small amount of ammonium chloride the toluene was removed by evaporation under reduced pressure. The remaining liquid was distilled to give 13.8 grams of a viscous liquid, B.P. 110–130° C. (3.5 mm. Hg) that slowly solidified, M.P. 59–66° C. An analytical sample was obtained by crystallization from chloroform, M.P. 67.5–69° C.

ANALYSIS FOR $C_5H_{11}NO_2$

|  | C | H | N |
|---|---|---|---|
| Calculated | 51.26 | 9.46 | 11.96 |
| Found | 51.55 | 9.69 | 11.94 |

What is claimed is:

A process for preparing alpha-hydroxy amides which comprises reacting, under anhydrous conditions, a cyanohydrin of the formula $$HO-\underset{R^2}{\overset{R^1}{C}}-CN$$

and an alcohol of the formula $$R^1OH$$

in admixture with a hydrogen halide of the group consisting of hydrogen chloride, hydrogen bromide, and hydrogen iodide to form an imido ester and pyrolizing the imido ester to form the alpha-hydroxy amide; each $R^1$ above, individually is selected from the group consisting of alkyl of 1 to 12 carbons, alkenyl of 3 to 12 carbons, and aromatic hydrocarbon; and $R^2$ is of the group consisting of hydrogen, alkyl of 1 to 12 carbons, alkenyl of 3 to 12 carbons and aromatic hydrocarbon.

References Cited in the file of this patent

UNITED STATES PATENTS

| 2,229,897 | Migrdichian | Jan. 28, 1941 |
| 2,457,660 | Gresham et al. | Dec. 28, 1948 |
| 2,573,673 | Ritter | Oct. 30, 1951 |
| 2,601,387 | Gresham et al. | June 24, 1952 |
| 2,632,766 | De Benneville | Mar. 24, 1953 |
| 2,719,176 | Coover et al. | Sept. 27, 1955 |

OTHER REFERENCES

Plant et al.: "Journ. Amer. Chem. Soc.," Vol. 73, pp. 4076–77 (1951).

Mackenzie et al.: Jour. Org. Chem., Vol. 18, pp. 594–7 (1953), QD 241 J6.

Felkin Comptes Rendus, Vol. 240, pp. 2322–4 (1955), Q 46A14.

Morgan Chem. and Ind., pp. 854–855 (April–June, 1959), TP 1 S 63.